C. C. CLAWSON,
Assignor of one-half interest to W. SIMPSON.
Machine for Measuring and Packing Tobacco.
No. 9,172. Reissued April 27, 1880.
FIG. I.
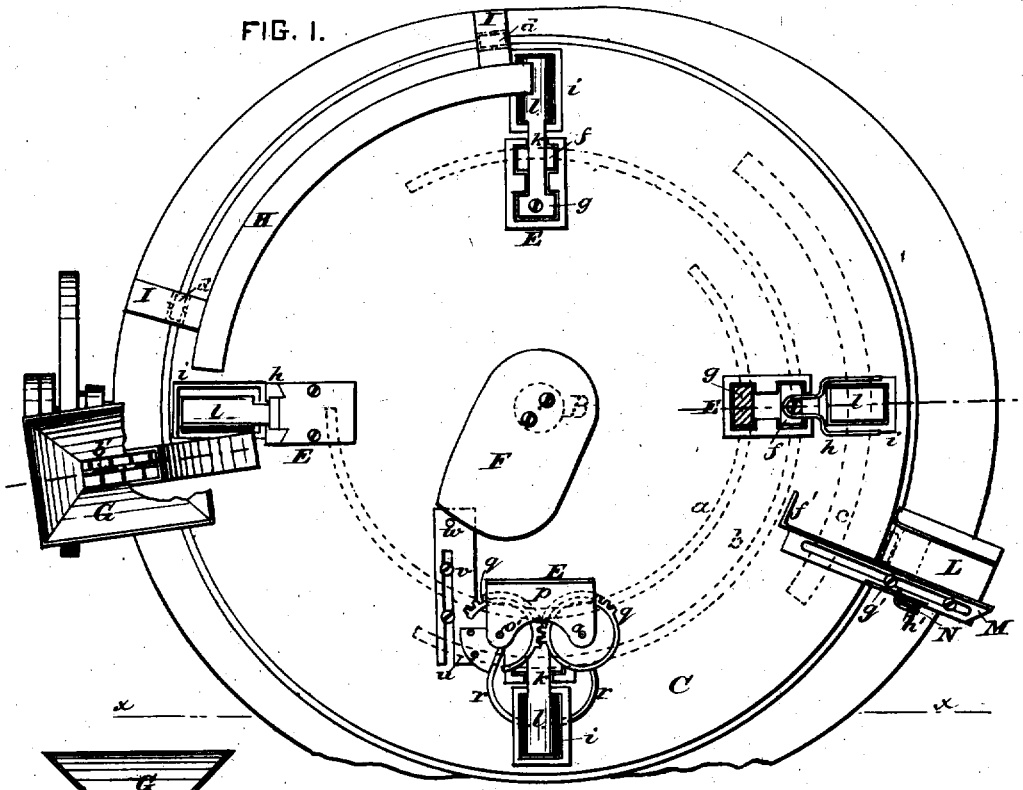
FIG. II.
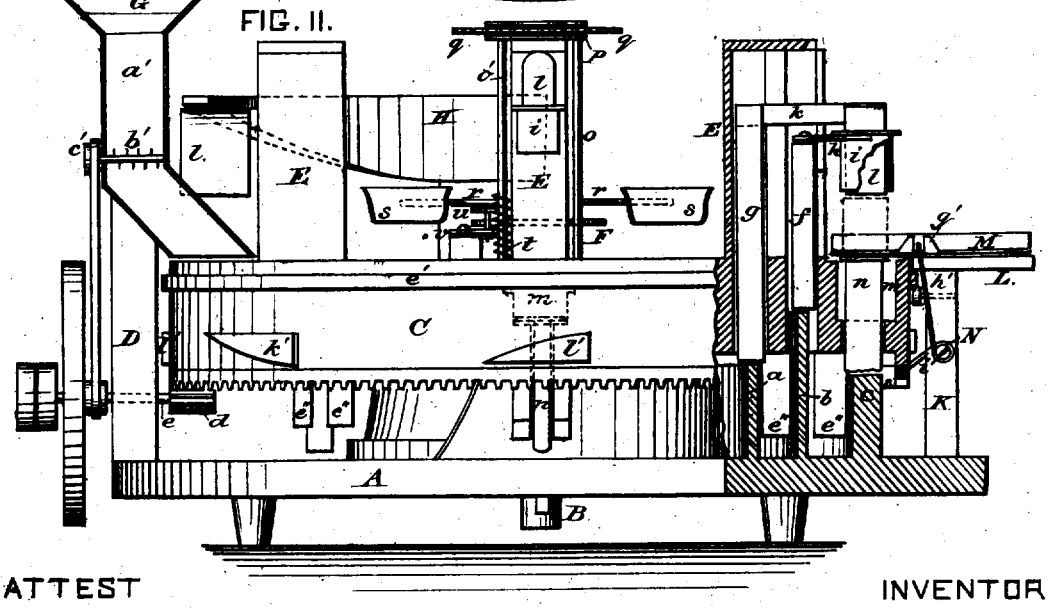
ATTEST
Jno. P. Stedman
Alexander Krette.
INVENTOR:
Clement C. Clawson.

UNITED STATES PATENT OFFICE.

CLEMENT C. CLAWSON, OF RALEIGH, NORTH CAROLINA, ASSIGNOR OF ONE-HALF OF HIS INTEREST TO WILLIAM SIMPSON, OF SAME PLACE.

MACHINE FOR MEASURING AND PACKING TOBACCO.

SPECIFICATION forming part of Reissued Letters Patent No. 9,172, dated April 27, 1880.

Original No. 198,793, dated January 1, 1878. Application for reissue filed August 15, 1879.

*To all whom it may concern:*

Be it known that I, CLEMENT COLRIDGE CLAWSON, of the city of Raleigh, county of Wake, and State of North Carolina, have invented a new and useful Improvement in Machines for Measuring and Packing Tobacco and other articles, of which the following is a specification.

Figure 1 is a plan view of my improved machine. Fig. 2 is a side elevation, partly in section.

Similar letters of reference indicate corresponding parts.

The object of my invention is to provide apparatus for accurately measuring smoking-tobacco and other articles and packing it in bags and other holders with rapidity.

Machines have been heretofore devised for the packing of tobacco in which one or more of the required operations are performed by power or automatically; but they are all, so far as I am aware, necessarily limited in their action. The bags, being drawn over hollow forms or shapes, are filled with tobacco and placed in molds, (the order of these two steps being sometimes reversed,) and are then moved one at a time under a plunger, which reciprocates in stationary ways, and in this position each bag remains until the tobacco is pressed and the plunger rises, when it is removed to give place to another, so that the machine is practically at a stand-still while the tobacco is packed in each bag. In some machines the form is withdrawn automatically after the packing is finished; but in any case, when using machines heretofore known or used, many of the operations have to be performed by hand—to wit, first, the drawing of the bag over the form, which holds the bags extended, and through or into which the charge of tobacco is introduced; second, the placing of the form and bag in the recess or mold which sustains the bag in the compressing or packing operation; and, third, the removal of the form after the packing is finished and after its complete or partial release from the package by the machine, as well as, fourth, the final operation of tying the mouth of the bag.

The removal of the package from the mold and the filling of the bag after it is drawn over the form are also effected by hand usually.

In this machine the general principle is different. Its operation is continuous. During the packing of the tobacco there is no stop. Instead of moving the form, bag, and mold or recess under the plunger, they, together with the latter, are carried by a rotary table, and stationary cams act upon the plunger and cause it first to descend to pack the tobacco and then to rise. By a stationary cam, also, the form is withdrawn from the bag. Several bags may therefore be simultaneously undergoing the compressing operation, with different plungers, of course, in different stages, or other operations may be performing.

The form is fastened to a sliding bar, and constitutes in the operation a permanent part of the machine. The workman is not obliged to draw the bag over the form by hand and then insert it in the mold, as heretofore; but he places it over a holder adapted to receive it, which holds the same extended, and the form descending at the proper time through the operation of its cam, enters it and carries it into the recess just below, this recess being in the upper side of the revolving table which carries the form and plunger. By these means I dispense with hand operations, before necessary, and also with the numerous loose forms heretofore always employed.

When depressed, as above mentioned, the top of the form is flush with the upper surface of the table, and it is in that position passed under the mouth of a hopper, which delivers the tobacco in the desired quantity. The pressing and packing operations and the removal of the form then take place in the manner stated.

The removal of the bag or package from the mold or recess is automatically effected by means of a follower, against the upper end of which the bag rests, and a cam which at the proper time raises the follower, so that the latter pushes the package out of the recess or mold. When raised the bag is seized by an automatically-operated device and delivered upon a side table, where it is tied by hand.

The only hand-labor involved, therefore, beyond the general care of the machine consists in placing the bags in position on the holders and tying them when packed. The operation being continuous, by the use of a sufficient number of forms, bag-holders, recesses or molds, and plungers, the packages of tobacco ready for tying can be delivered by one compact machine as fast as the attendant can place the bags in position on the holders.

Referring to the drawings, A is the bed of the machine, upon which three concentrically-arranged cams, *a*, *b*, and *c*, are fixed, and arranged around a post, B, which is fixed in the center of the bed A. C is a rotating table, which is placed on the post B, and is provided with a circle of cogs on its under surface, that are engaged by a pinion, *d*, on the shaft *e*, which shaft is journaled in the post D, that is secured to the bed of the machine. Four vertical guides, E, project through the table C, and in each of them two vertically-sliding bars, *f g*, are placed, and the guides E are slotted at their lower ends, so as to permit the cams *a b c* to pass the lower ends, *e''*, of the guides E, extending nearly to the bed of the machine, as shown in the drawings. To the upper end of each of the bars *f* an arm or projection, *h*, is attached at right angles, upon which a sheet-metal form, *i*, is fixed. To the upper end of each of the bars *g* an arm, *k*, is attached, that extends outward parallel to the arm *h*, and carries a plunger, *l*, that fits into the form *i*. In the table C, below the form *i*, a recess, *m*, is made of sufficient size to receive the said form, and in the recess there is a follower or discharger, *n*, the lower end of which extends downward through the table.

At the sides of the vertical guides E shafts *o o'* are placed, the lower ends of which are journaled in the table and the upper ends in a plate, *p*, at the upper end of each of the guides. (For convenience of illustration the shafts *o o'* and connected mechanism for one only of the guides are shown.) These shafts are provided at their upper ends with segmental wheels *q*, which mesh together and transmit motion from one to the other, so that they can be moved in opposite directions. To the shafts *o o'* arms *r* are attached, to which plates *s* are fixed, that are of sufficient size to receive and hold the tobacco-bag until taken by the form *i*. A spring, *t*, is placed on the shaft *o'*, which throws the arms *r* and plates *s* apart, and upon the same shaft a sector-shaped plate, *u*, is fixed, from which two pins project downward. Said pins are engaged by notches in a slide, *v*, that is carried by the table C. A pin, *w*, projects from the upper surface of this slide, and is engaged by a stationary cam, F, that is fixed to the top of the post B.

G is a hopper, having a chute, *a'*, the lower part of which is inclined and fitted to the face of the table C, so as to prevent the tobacco from spreading. The hopper is stationary, and is supported by the standard D. The mouth of the chute is of the same size and shape as the form *i*, which, as shown, is of general rectangular shape, corresponding in size with the receptacle or bag into which the tobacco is to be packed. Below the hopper, in the vertical portion of the chute *a'*, a toothed shaft, *b'*, is journaled, which is provided with a pulley, *c'*, that is driven by a belt from a pulley on the shaft *e*.

A curved cam, H, is supported above the table C by posts I, said posts being secured to the bed A. There are rollers *d* on the inner sides of the posts I, which support the table C by engaging the flange *e'* formed thereon. On the side of the bed, nearly opposite the posts I, there is a post, K, to the top of which a table, L, is attached, which is of the same height as the table C. Upon this table there is a slide, M, that is provided with a right-angled arm, *f'*, and with a notched ear, *g'*, that is engaged by the arm *h'* of the right-angled lever N. This lever is pivoted to the post K, and its shorter arm *i'* is engaged by cams *k' l'*, arranged on the periphery of the table C.

The operation of the machine is as follows: A quantity of tobacco is placed in the hopper G, which passes downward through the chute *a'* and rests upon the surface of the table C. Motion is imparted to the shaft *e* in any convenient way, causing the table C to rotate from right to left. The mouth of a bag is drawn over the plates *s s*, accompanying each guide as it in turn reaches the position in which, by the action of the cam F on the slide *v*, the plates are brought together, as shown in Fig. 1, the form *i* and plunger being then in an elevated position.

The operation with reference to each of the guides E and connected devices carried by the table C being the same as they successively move past the cam F, hopper G, cam H, and table L, I will describe the operation with respect to one only. As the table rotates the slide *v* is released from the cam F, and the spring *t* throws the plates *s* apart, so that they hold the bag until the form *i* descends into the bag and carries it downward into the recess *m*. When the said recess passes under the chute *a'* the form *i* is filled with tobacco, and when the form passes the chute the plunger *l* is allowed by its cam *a* to descend, and as the table rotates the plunger comes under the cam H, and is forced downward into the form, compressing the tobacco. Before the plunger escapes from the cam H the form *i* is raised by its cam *b* a distance equal to the length of the bag or package, or slightly more, so as to surround the plunger and leave the tobacco in the bag between the said plunger *l* and the follower *n*. When the plunger *l* escapes from the cam H the follower or discharger *n*, the form *i*, and plunger *l* are raised by their respective cams *c b a* until the upper surface of the follower *n* is even with the top of the table C, when the said follower remains stationary, and the form *i* and follower *l* continue to rise, to release the bag, which is now taken by the slide M and delivered to the table L, said slide being moved at the proper instant by the lever N, which is engaged by the cams

*k' l'*. The plates *s* are now brought together by the cam F and the operation repeated.

The bags are taken from the table L and tied by hand.

Any required number of followers, forms, and plungers may be employed.

Having thus fully described my invention, I claim as new and desire to secure by Letters Patent—

1. The combination of the bed A, having cams *a b c*, the table C, carrying a vertical guide, E, a follower or discharger, *n*, form *i*, plunger *l*, and sliding bars *f g*, substantially as shown and described.

2. The plates *s*, arms *r*, shafts *o o'*, spring *t*, slide *v*, and cam F, in combination, substantially as set forth.

3. The table L, slide M, and lever N, in combination with the table C, having on its periphery cams *k' l'*, substantially as described.

4. The hollow form or shape *i*, fastened to the sliding bar *f* with the arm or projection *h*, and thus constituting, during the operation, a permanent part of the machine, substantially as set forth.

5. The combination of the supporting-table, guides E, slotted at their lower extremity, sliding bars, and cams for elevating said bars, substantially as described.

6. The combination of a hopper, a table provided with a recess or mold, a hollow form, a plunger, and cams for operating the plunger, the said form and plunger being carried by said table and being movable with reference to said hopper, substantially as described.

7. The combination, with the table, mold or recess, form, and reciprocating plunger of a packing-machine, of the follower or discharger *n* and operating-cam, substantially as described.

8. The combination, with a mold or recess and a device for receiving and holding the extended bag to be filled, of the hollow form attached to the sliding bar and its operating-cam, substantially as described, whereby the said form automatically, by means of said cam, enters the bag placed on the aforesaid device and carries it into the mold or recess.

9. The combination of the table C, provided with a recess, *m*, plunger *l*, form *i*, sliding bars *f g*, to which said form and plunger are attached, hopper G, and cams H *a b*, substantially as described.

CLEMENT C. CLAWSON.

Witnesses:
JNO. P. STEDMAN,
ALEXANDER KRETH.